Figure 1:
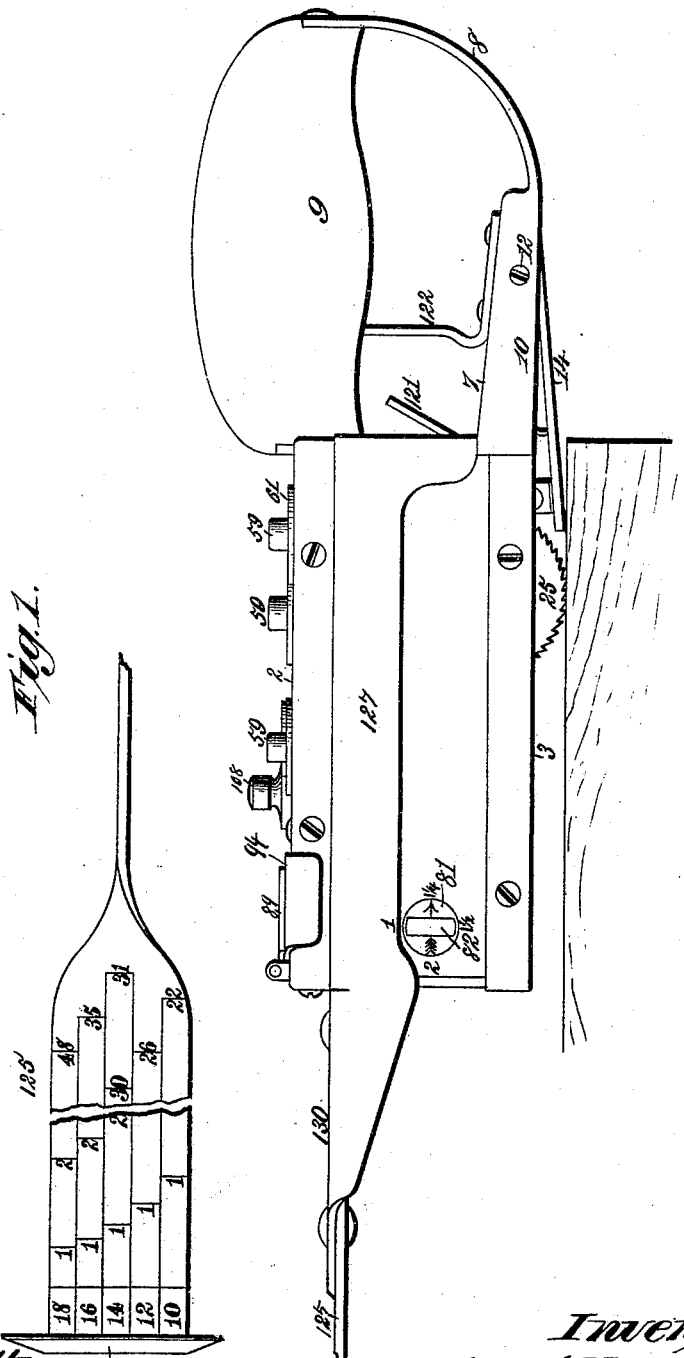

(No Model.) 5 Sheets—Sheet 1.
E. N. BARBER.
LUMBER MEASURE.

No. 448,291. Patented Mar. 17, 1891.

Witnesses
Robert Everett
J. G. Myers Jr.

Inventor:
Emmet N. Barber,
By James L. Norris.
Atty.

(No Model.) 5 Sheets—Sheet 2.
E. N. BARBER.
LUMBER MEASURE.
No. 448,291. Patented Mar. 17, 1891.
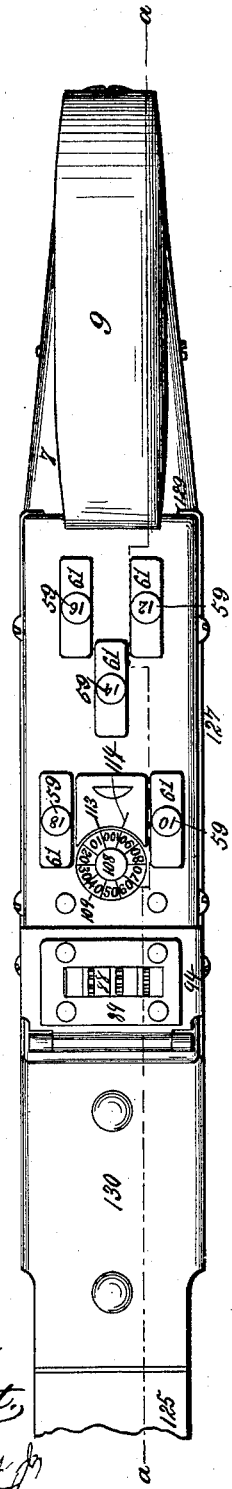
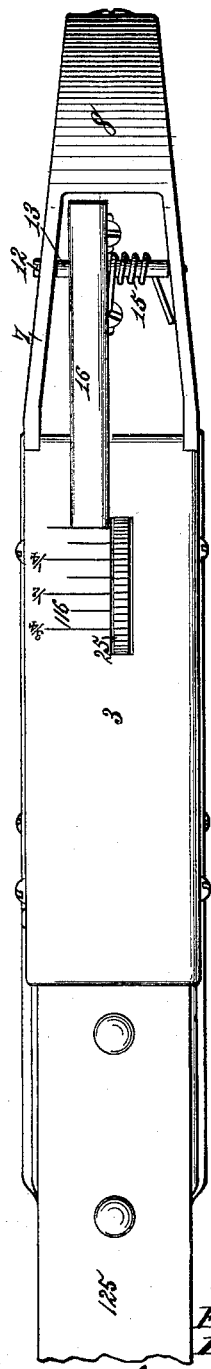
Witnesses.
Inventor:
Emmet N. Barber,
By James L. Norris.
Atty.

(No Model.) 5 Sheets—Sheet 3.

E. N. BARBER.
LUMBER MEASURE.

No. 448,291. Patented Mar. 17, 1891.

Witnesses.
Robert Everett.
J. Y. Myers

Inventor.
Emmet N. Barber.
By James L. Norris.
Atty.

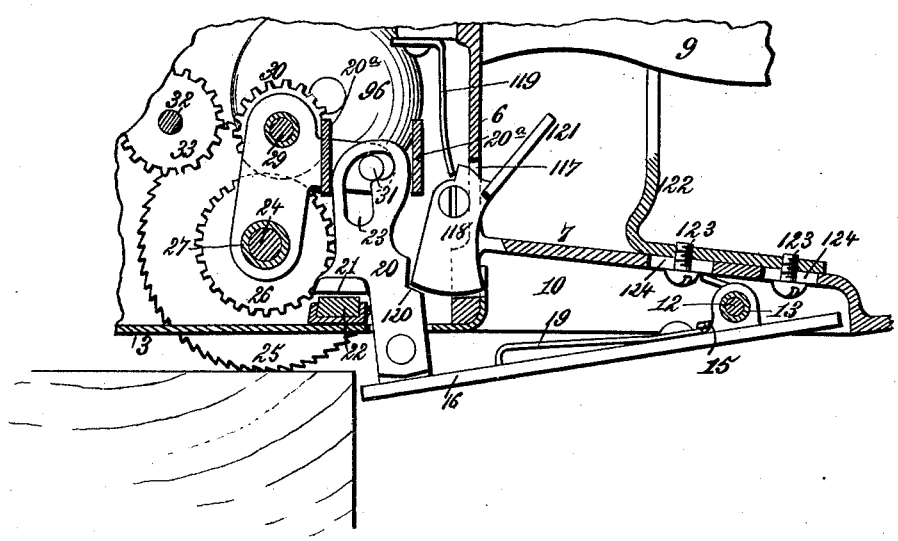

(No Model.) 5 Sheets—Sheet 5.
E. N. BARBER.
LUMBER MEASURE.
No. 448,291. Patented Mar. 17, 1891.
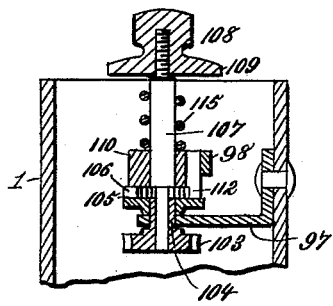
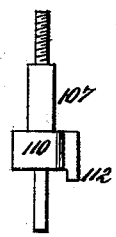
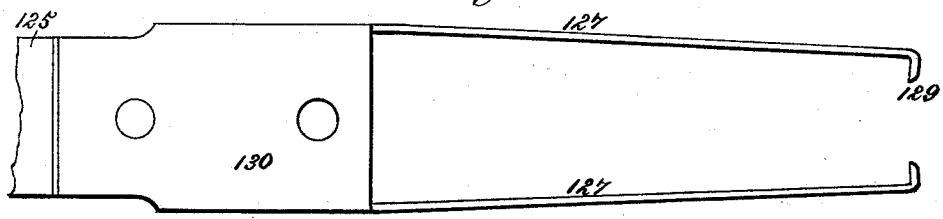
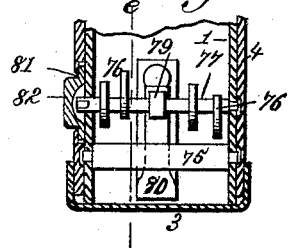
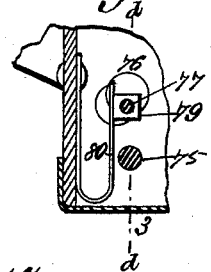
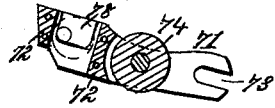
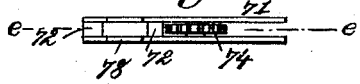
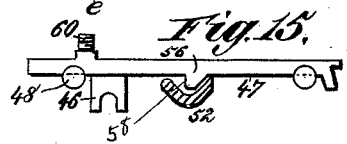
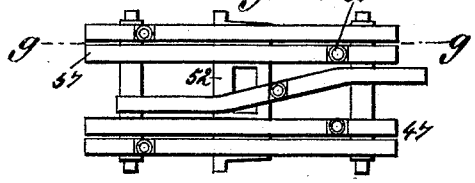
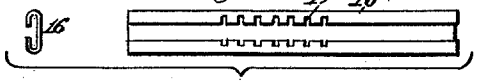
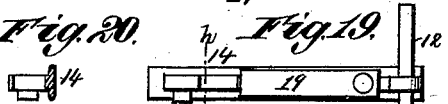
Witnesses
Robert Burrett
J. G. Myers Jr.
Inventor
Emmet N. Barber
By James L. Norris
Atty.
THE NORRIS PETERS CO., PHOTO-LITHO., WASHINGTON, D. C.

UNITED STATES PATENT OFFICE.

EMMET N. BARBER, OF KENT, OHIO.

LUMBER-MEASURE.

SPECIFICATION forming part of Letters Patent No. 448,291, dated March 17, 1891.

Application filed November 26, 1889. Serial No. 331,610. (No model.)

*To all whom it may concern:*

Be it known that I, EMMET N. BARBER, a citizen of the United States, residing at Kent, in the county of Portage and State of Ohio, have invented new and useful Improvements in Lumber-Measuring Apparatus, of which the following is a specification.

My invention relates to apparatus for measuring lumber of various lengths and thickness, and the purpose thereof is to provide a registering mechanism operated in turn by any one of several separate series of differential gearing actuated by a measuring-wheel which traverses the surface of the lumber, the entire mechanism being arranged within a casing from which the measuring-wheel projects sufficiently to enable it to engage with the face of the lumber, and the said wheel being adapted to use with devices whereby any one of the differential actuating-gears may be brought into operative engagement with the train of differential gearing operating the register.

It is a further purpose of my invention to combine with a registering apparatus of the type specified simple automatic means whereby the main actuating-wheel may be disconnected from the operating-gears when the measure is not in use.

It is my purpose, also, to provide a registering-measure of this type with a runner-slide, by which the measuring-wheel is geared with the train operating the register, said slide or runner being adjustable to compensate for or to make any desired allowance ordinarily made for what has been removed from the edges of the boards in working.

It is my further purpose to combine with the casing of a lumber-measure a detachable board-rule, whereby boards may be handled and picked up and measured without requiring the operator to stoop over when standing on a pile measuring lumber.

It is my purpose, also, to combine with a registering-measure of the type specified simple means whereby the operator may be notified, audibly, when he is approaching the maximum measurement required, the mechanism being capable of adjustment in such manner as to afford the desired notification at any point short of the desired measurement.

It is a further purpose of my invention to simplify and improve the construction and operation of the means whereby the differential trains of gearing are individually brought into and out of operation, and whereby, also, the engagement of any one train shall automatically disengage the train previously in action and allow the engaging device to be retracted to unmesh the gears.

One of the special purposes of the present invention is to provide means for easily and instantaneously shifting the connection between the several trains of differential gearing and the parts from which operation is derived to adjust the measure to different lengths, the shifting devices being simple in operation, requiring but little practice on the part of the operator to perfectly familiarize him with their use, and being so arranged that the aid of the eye is not required in actuating them. As the different lengths of lumber are piled indiscriminately together, it is evident that the gearing may require to be shifted for each piece, and one of the most essential requirements of a registering-measure is that the means for accomplishing this shall be of such character that the operator's time and attention shall not be required therefor to any material degree, and that the adjustment be effected accurately and instantaneously without the assistance of the eye. It is one purpose of my invention, therefore, to provide means of this kind.

The invention also contemplates certain improvements in construction, combination, and operation of parts, all of which are fully described hereinafter, and defined in the claims following this specification.

To enable those skilled in the art to understand and practice my invention, I will describe the same in detail, reference being had to the accompanying drawings, in which—

Figure 4:
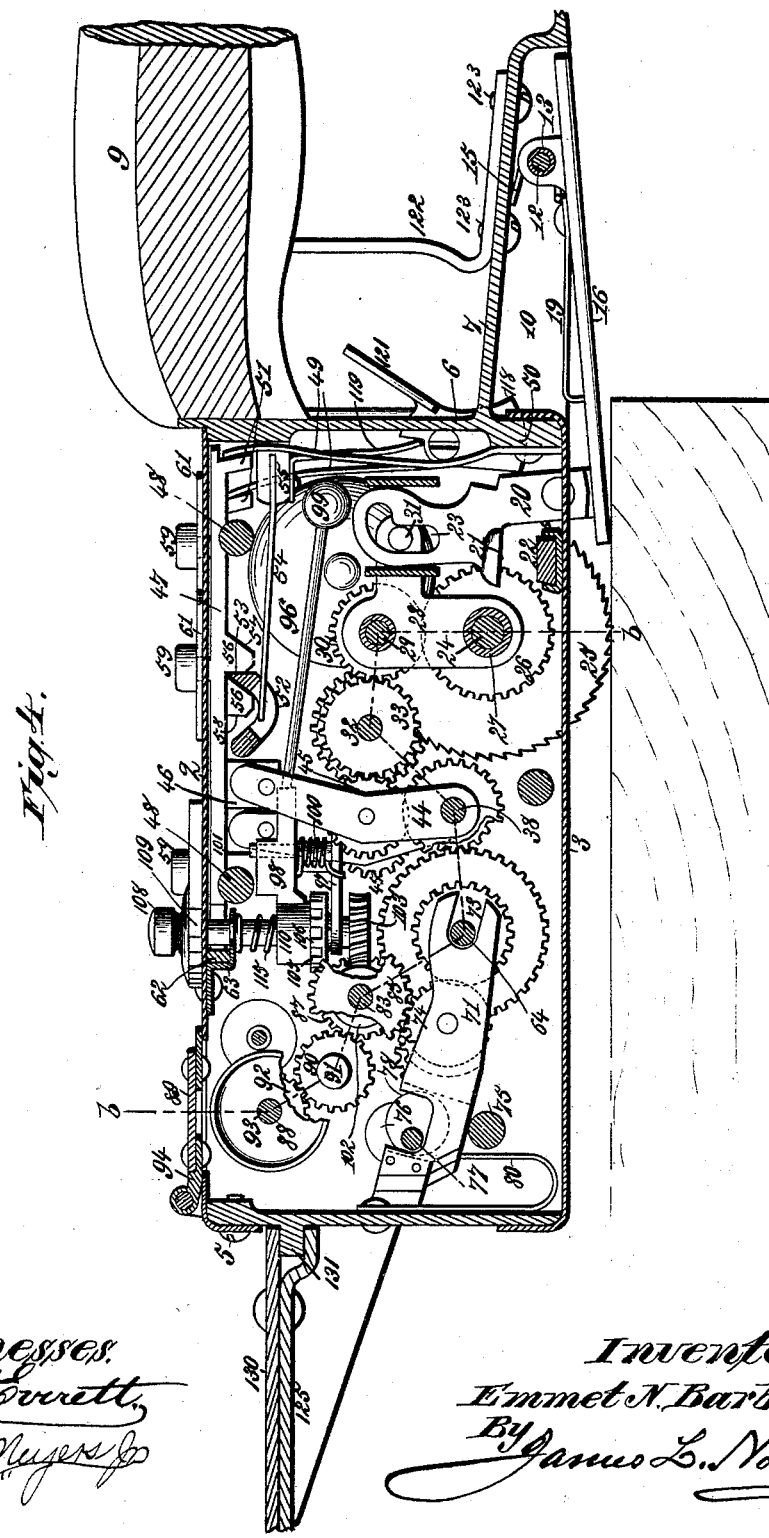

Figure 1 is a side elevation showing the apparatus-casing with its handle and board-rule extension, the latter being of the usual length of a board-rule. Fig. 2 is a plan view of the parts shown in Fig. 1. Fig. 3 is a bottom or inverted plan view of the same. Fig. 4 is a longitudinal section upon the line *a a*, Fig. 2. Fig. 5 is a detail section showing parts of the apparatus illustrated in Fig. 4, with the parts in a different position. Fig. 6 is a section upon the line *b b*, Fig. 4. Fig. 7 is a plan view of the bell mechanism, most of the other parts being removed. Fig. 8 is a partial vertical section on the line c c, Fig. 7. Fig. 9 is a detail view of the bell-ringing shaft removed. Fig. 10 is a plan view of one end of the board-rule extension. Fig. 11 is a detail vertical section upon the line d d, Fig. 12, showing the shaft operating the eccentrics shifting the gearing for measuring lumber of different thickness. Fig. 12 is a detail section in the line e e, Fig. 11. Fig. 13 is a detail section on the line e e, Fig. 14. Fig. 14 is a plan view of the yoke shown in section in Fig. 13. Fig. 15 is a detail sectional view of one of the bars or slides shifting the gearing and their retaining-pawl, the section being taken upon the line g g, Fig. 16. Fig. 16 is a plan view of the shifting bars or slides and their retaining-pawl. Fig. 17 is a detail view of the adjustable shoe carried by the runner, said shoe being shown in this figure in plan and in end elevation. Fig. 18 is a side elevation of the runner, the shoe being removed. Fig. 19 is a plan view of the parts shown in Fig. 18. Fig. 20 is a section on the line h h, Fig. 19.

In the said drawings, the reference-numeral 1 denotes two parallel vertical walls of a metallic casing, in which the shafts carrying the gearing have bearing. The casing, which is substantially rectangular in cross-section, is composed in part of upper and lower plates 2 and 3, which are provided with side flanges overlapping upon the covering-plates 4, as shown in Figs. 1, 4, 6, and 11, which are formed of hard rubber, papier-maché, or other suitable material, and placed outside of the plates 1 and 1 to exclude dust and dirt from the shaft-bearings therein. The top and bottom plates 3 and 4 also overlap upon the end walls of the casing, as shown in Fig. 4, and they are secured in place by screws 5 or by any other suitable means.

From the forward end wall 6 projects an extension 7, which may be integral with said end wall. This extension, which springs from a point somewhat above the lower edge of the end wall 6, projects forward with a slight downward inclination to a point where it is curved abruptly downward and thence bent upward and forward, forming a curved support 8 for one end of the handle 9, the other end of the latter being fastened in any suitable manner to the end plate 6. The sides of the extension 7 are bent downward into substantial parallelism, forming vertical flanges 10.

Through the vertical flanges 10 is passed a pivot pin or bearing 12, upon which is mounted a sleeve 13. This sleeve supports a runner-plate 14, having a lug at its end through which the sleeve passes. A spring 15, coiled upon the sleeve and bearing at one end against the extension 7 and at its other end against the runner-plate 14, throws the free end of the latter, which underlies the end of the casing, downward. Upon the runner-plate is slipped a shoe 16, consisting of a metal plate having its parallel edges bent to overhang the body of the plate, as shown in Fig. 17, whereby it may slip easily over the runner-plate. In the overhanging edges or flanges of the shoe are cut at regular and suitable intervals notches 17, with which the hooked end 18 of a spring-detent 19, mounted on the runner-plate 14, engages. By means of this construction the shoe may be adjusted longitudinally upon the runner-plate in such manner as to project more or less beneath the forward end of the casing, for a purpose presently to be shown.

Upon the free end of the runner-plate 14 is mounted a link 20, which projects upward and passes through a slot in the casing into the interior thereof. This link is provided with a horizontal shoulder 21, which seats upon a cushion 22 when the runner-plate is thrown down by the spring 15. Above this shoulder the link is provided with an angular slot 23, a portion of which is vertical, or substantially so, while the remainder of said slot is curved toward the forward end of the casing. The portion of said link moves between fixed guides 20$^a$, by which it is compelled to move in a substantially right line. Within the casing is arranged a shaft 24, journaled, like all the shafts, in the side walls 1 and 1. Upon this shaft is mounted a measuring-wheel 25, having its lower edge projecting through a slot in the bottom wall of the casing. The periphery of this wheel is toothed to cause it to readily engage and accurately travel upon the surface of the lumber. Upon the said shaft 24, alongside the measuring-wheel 25, is mounted a driving-gear 26, and upon a sleeve 27, loose on said shaft, is a lever 28, having substantially the form of a bell-crank. Upon a stud 29, arranged at or near the angle of this lever, is journaled a gear 30, which is constantly in engagement with the gear 26. By raising and lowering the free end of the runner-plate 14 it will be seen that the link 20 will rise and fall within the casing, and a stud or pin 31, mounted upon the arm of the bell-crank lever 28 and lying in the slot 23 of the link 20, will be caused to traverse the said slot. As the link rises the pin will pass out of the forwardly-curved end of the slot into its horizontal portion, and in so doing it will rock the lever 28 on its bearing and carry the gear 30 somewhat toward the rear of the casing.

Upon the shaft 32, parallel with the shaft 24, is mounted a gear 33, with which the gear 30 engages upon each upward movement of the runner-plate 14 or link 20, and from which it is disengaged whenever the runner-plate is thrown down by its spring. Upon this shaft 32 are mounted rigidly the differential gears 34, 35, 36, and 37, increasing uniformly in diameter in the order in which they are named.

Upon a shaft 38, arranged in rear of and beneath the shaft 32, are arranged the co-operating series of differential gears 39, 40, 41, 42, and 43, arranged in a reverse order—that is to say, the larger 39 of the co-operating series being opposite the smallest gear 34 on the shaft 32, the next largest gear 40 opposite the gear 35, &c. Each of the co-operating gears 39 40 41, &c., is inclosed by a yoke 44, the parallel arms of which are pivotally mounted at their lower ends upon the shaft 38. Journaled in each of these yokes in such manner as to be permanently in mesh with the differential gear below on the shaft 38 is a gear 45, which lies opposite or in the same vertical plane with the corresponding differential gear upon the shaft 32. The upper end of each yoke is pivotally connected to a lug 46, depending from one of a series of slide-bars 47, arranged longitudinally beneath the top of the casing and supported upon transverse bars 48. These slide-bars are normally thrown toward the rear of the casing to hold the gears 45 out of mesh with the differential gears on the shaft 38 by means of springs 49, mounted on a lip 50, projecting from the inner face of the end wall 6 at its lower edge. The ends of said springs engage lugs 51, which drop from the forward ends of the slide-bars.

Beneath the slide-bars 47 is arranged a pawl 52, having a lip 53, which extends transversely beneath all the slide-bars 47, and is thrown up by a spring 54, which is supported at one end in a lug 55, mounted on the end plate 6. This pawl is provided with pivotal journals at its ends, as shown in Fig. 16, and these journals have bearing in the vertical parallel walls 1 and 1 of the casing. The extended edge of the pawl engages with depending lugs 56 on the slide-bars 47, said lugs being formed with foward inclined edges 57, which pass over and snub the pawl 52, which then snaps behind a square shoulder 58, holding the bar, when the latter is drawn forward, in such position that the gear 45, carried by the yoke operated by said bar, is held in mesh with that one of the differential gears on the shaft 32 which is opposite the said gears 45 and in the same vertical plane therewith.

The slide-bars 47 are operated by keys 59, which are mounted upon threaded nipples 60 upon the bars. These nipples pass through longitudinal slots in the upper or top wall 2 of the casing, such slots being covered by slide-plates 61 to exclude dust and dirt. As any of the slide-bars are operated by means of the keys the pawl 52 is depressed by its depending lug 56 far enough to automatically release any one of the slide-bars already in engagement therewith, and the bar thus released is shot by its spring 49 toward the rear of the casing, swinging its yoke 44 and unmeshing the intermediate gear 45 carried by said yoke. This release is effected by giving a curved or convex form to the lower ends of the depending lugs 56. As the bars 47 are shot backward by their springs 49 their rearward ends strike against a cushion 62, formed of a strip of leather or other suitable material and held in place by a bracket 63, attached to the top plate 3. The several keys 59 or the slide-plates 61 connected therewith are marked with numerals 10, 12, 14, 16, and 18, indicating different lengths of lumber to be measured, as more fully pointed out hereinafter.

Upon a shaft 64 in rear of the shaft 38 are mounted a series of differential gears 65, 66, 67, and 68, ranging from the smallest to the largest diameter by a uniform increase, in order to vary the account or action of the apparatus according to the thickness of the lumber. The shaft 64 is operated by a gear 69, meshing with a gear 70 on the shaft 38.

Within the rearward portion of the casing is arranged a series of yokes 71, composed of flat parallel metallic plates separated by intermediate blocks 72 and united by rivets passing through said blocks. The forward ends of these plates are provided with slots 73, Figs. 13 and 14, which receive the shaft 64, Fig. 4, the slotted ends of said plates straddling the gears 65 66 67, &c., the number of the yokes 71 being equal to the number of the differential gears. Within each of said yokes is journaled a gear 74, and the yokes are supported at their slotted ends upon the shaft 64 and at their other extremities upon a transverse bar 75, set in the side walls of the casing. These yokes are normally thrown forward and retracted to mesh and unmesh the gears 74 with the differential gears of the shaft 64 by means of eccentrics 76, lying between the parallel plates of the yokes and between the separating-blocks 72. These eccentrics are rigidly mounted upon a shaft 77, journaled in the side walls of the casing and lying in notches 78 cut in the plates of the yokes between the blocks 72 deep enough to admit the eccentrics. The latter are arranged upon their shaft "quartering" with one another, or in such manner that while all act simultaneously upon the yokes the action is such that but one of the gears 74 is thrown into operative mesh at each quarter-turn of the shaft 77, while the other three are withdrawn from mesh. In order to hold the shaft in proper position to preserve the operative engagement of one gear and the disengagement of the others at each quarter-turn of the shaft, a square block 79 is mounted thereon, and a leaf-spring 80, bolted to the end wall of the casing, bears against the same, checking and holding the shaft at each quarter-turn, as shown in Fig. 12. As shown and described, the shaft 64 being provided with four differential gears, the apparatus is adapted to measurements of four different thicknesses, and therefore four yokes are required, and the block 79 is rectangular or four-sided. If more or less differential adjustments are desired to adapt the instrument to measurements of different thicknesses, the shape of the block 79 must be changed accordingly to have three, five, or more sides, as the case may be. One end of the eccentric-shaft 77 projects through the wall of the casing, and the protruding portion is either flattened or made angular in cross-section and is inserted in a socket in an index-plate 81, set in a recess in the side wall of the casing. Upon the outer face of this index-plate is mounted or formed a bar 82, by which the plate may be turned, and the adjustments of the eccentric-shaft are indicated by figures upon the side wall of the casing—as, for example, 1, 1¼, 1½, and 2—and when the arrow on the index-plate is turned to point to any one of these numbers the operative engagement of the differential gear corresponding to the thickness indicated by such number will be effected.

Upon the shaft 83, arranged above the yoke 71, are mounted the differential gears 84, 85, 86, and 87, ranging from the greatest to the least diameter and corresponding with the differential gears 65, 66, 67, and 68 on the shaft 64, the arrangement being such that as the intermediate gears 74 are carried by the yokes 71 into mesh with the differential gears of the shaft 64 they are also operatively meshed with the gears 84, 85, 86, or 87.

The registering mechanism 88 is arranged in the upper rearward angle of the casing, and, as shown, consists of a series of four disks having suitable registering-connection, the numerals displayed upon their peripheries being visible through a pane of transparent material 89. Movement is communicated to the initial disk of the registering-train by means of an intermediate gear 90, mounted on the stud 91, which projects from the side of the casing, said intermediate meshing with the differential gear 87 on the shaft 83, and also with a gear 92 of the same size on the shaft 93 of the register. The registering-disks are accessible by means of a lid 94, hinged or pivoted to cover an opening in the top wall of the casing, in which lid the transparent pane 89 is set. This lid is swung open to enable the registering-disks to be turned back to zero for a new count.

Upon the side wall of the casing is attached a bell or gong 96 of any suitable form. Upon the same wall, at a little distance in rear of the bell, is mounted a bracket 97, Figs. 7 and 8, upon an arm of which is pivoted a lever 98, carrying the striker 99. The lever is acted upon by a spring 100, coiled upon the stud or pivotal bearing 101, which supports the lever 98 and actuates the latter to throw the striker toward the bell.

Upon the middle portion of the shaft 83 is a worm 102, with which meshes a worm-gear 103, having ten teeth. This worm-gear is carried by a hollow or tubular shaft 104, passing up through an opening in the bracket 97, which forms a bearing for said shaft. Upon the shaft 104 above the bracket is attached a clutch-disk 105, having ten teeth 106, which projects upward after the manner of a crown-gear. A cam-shaft 107 has bearing at its lower end in the hollow shaft of the worm-gear 103, its upper end having a bearing in the stop-bracket 63, through which and through the top plate of the casing its end passes to receive an index-nut 108, screwed thereon and having a flange 109. Upon the shaft 107 is mounted a scroll-cam 110, having a single tooth 112 depending from its lower face to engage the teeth 106 of the clutch-disk 105. Against the face of the scroll-cam bears the end of the lever 98, which is gradually swung by the revolution of the cam against the action or pressure of the spring 100, and at the completion of the revolution the lever-arm passes off the cam and snaps toward the cam-shaft, throwing the striker against the bell. The worm, worm-gear, clutch, and cam when operatively connected produce one complete revolution of the scroll-cam for each one hundred feet of lumber measured.

Upon the flange 109 of the index-nut 108 are numerals 10, 20, 30, &c., up to 100. Upon the top plate of the casing is arranged a slide-plate 113, having its edge concaved to fit the periphery of the flange 109 of the index-nut. Upon this plate or slide are marked lines 114, registering as the index-nut is turned with the segmental divisions of the flange 109, containing the numerals 10, 20, &c. The cam-shaft 107 is normally thrown down to preserve the operative engagement of the teeth of the clutch-disk 105 with the single tooth 112 on the scroll-cam by a spring 115, coiled on the cam-shaft 107 and bearing against the scroll-cam and the stop-bracket 63. The latter may be raised, however, to clear the tooth 112 from the teeth of the clutch-disk by simply raising the index-nut 108, and the shaft may be turned to mesh the said tooth 112 with any part of the clutch-disk.

The function of the bell and its mechanism is to warn the operator that he is approaching the limit or termination of a given measurement, in order that he may not inadvertently overturn the same and measure out more than is required. With the register set at zero the cam-tooth may be so set on the clutch-disk that the bell will ring after measuring ten, twenty, thirty, forty, fifty, sixty, seventy, eighty, or ninety feet, and it will also ring at the completion of every one hundred feet measured thereafter. Thus if the operator wishes to measure three hundred and fifty feet and desires to be warned before he has quite reached that amount, in order that he may not overrun it, he lifts the index-nut 108 and turns it until the figures "40" on the flange 109 lie between the lines 114 on the slide-plate 113. The index-nut is then dropped to mesh the tooth 112 on the scroll-cam with the teeth 106 of the clutch-disk. The bell will now ring after measuring forty feet, one hundred and forty feet, two hundred and forty feet, and three hundred and forty feet. There being only ten feet required to complete the measurement, the operator can now watch the register and stop at the exact completion of the three hundred and fifty feet.

When it is desired to ascertain the amount of lumber in a given pile, the bell is of no use, and the clutch-disk 106 and cam-tooth 112 are disconnected by lifting the index-nut 108 and pushing the slide-plate 113 between it and the top plate of the casing to throw the bell mechanism out of action and retain it so.

The longitudinal adjustment of the shoe 16 upon the runner 14 is regulated by a scale 116 upon the bottom plate of the casing, Fig. 3, beside the measuring-wheel. This scale is graduated to one-eighth of an inch and extends to three-quarters of an inch in length. It is employed in measuring lumber that has been worked to make the necessary allowance or compensation for the same—anywhere from one-eighth to three-fourths of an inch.

To render the function of the shoe 16 in connection with the scale 116 entirely clear, let it be supposed that the shoe is dispensed with entirely and that the extremity of the runner 14 is substantially coincident, as in Fig. 1, with the point at which the measuring-wheel 25 engages with or begins to travel upon the lumber. It will be seen that as the runner is applied to the board and the measure drawn or moved transversely thereof the registry will begin to operate the instant the measuring-wheel makes contact with the edge of the board, and it will also be seen that the extremity of the runner will coincide with the said edge of the board at the moment the measuring-wheel begins its movement. Under the arrangement of parts described, also, the end of the runner will pass off the board at the other edge before the measuring-wheel passes off and out of contact with the board. In other words, as the free end of the runner 14 is at one edge of the board at the instant the measuring-wheel begins to operate it must evidently reach the opposite edge at the instant the correct measurement is completed, and as the contact of the runner is broken the instant its free end passes off the board the operative connection with the register is broken at the moment the exact measurement is registered. If now the runner be prolonged—as, for example, by placing the adjustable shoe 16 thereon and moving it until its free end is brought into the vertical plane of the axis of the measuring-wheel—it will be seen that when the measure is used as described the shoe and runner will be pressed up and the operative connection made with the register, as before described, before the wheel 25 makes contact with the board. Now as the wheel rolls to the other edge of the board it will be seen that instead of the runner passing off said edge at a point in advance of the tangent or contact-point of the measuring-wheel it will preserve the operative connection between said wheel and register until the said tangent or contact-point of the wheel coincides with the end of the board. In this manner the register will record a measurement in excess of the correct face-measurement, or, in other words, it adds to the correct face-measurement the measurement of the strip which has been removed in working the lumber. The function of the scale 116 is to aid the operator in making the proper adjustment of the shoe and to show at a glance by the position of the end of the shoe on the scale just what fraction of an inch the machine is adding to the width of each board as an allowance for what has been removed in working its edges.

When measuring lumber over a planer or matcher the operator usually has a pocket in his apron, into which he drops the measure after taking the measurement of each board while he puts another into the machine. While in the pocket the runner or shoe 16 might be pressed toward the bottom of the casing, thus operatively connecting the measuring-wheel and the registering mechanism, and then if the wheel is turned by contact with the pocket or otherwise the register is moved and a false registration results. To prevent this I pivot within a vertical slot 117 in the end wall of the casing a latch or dog 118, and upon the lug 55 I mount a spring 119, by which the lower end of the latch is thrown toward the link 20 and, when the shoe 16 is thrown downward, automatically engaged with a notch 120 in said link, thereby preventing the rise of the link and the operative connection of the measuring-wheel and registering mechanism. Upon the latch 118 is formed or mounted a finger-lever 121, which when the latch and link are engaged projects at an angle with the end of the casing, as shown in Figs. 4 and 5. Upon the extension 7 I mount a bracket 122, extending parallel, or substantially so, with the end of the casing and extending to the handle 9, or nearly so. The bracket 122 is adjustable upon the extension 7 by means of screws 123, movable in slots 124, so that the space between it and the casing may be sufficient to admit the finger of the operator, whereby in grasping the handle to operate the measure the latch is disengaged. Upon the removal of the finger the latch resumes its normal position and instantly locks the runner and shoe in the position shown in Fig. 5.

The numeral 125 denotes a board-rule extension, intended for use when the operator stands upon a pile of lumber and turns over and picks up boards and then measures the same. This extension is provided with the usual cross-head 126 and is scaled like a board-rule. It is provided with the arms 127, pronged or hooked toward each other, and preferably turned into a plane standing at right angles with the scaled plate, to permit it to spring or bend in two directions. The extension is secured to the measure by means of these clasps 127, to which the extension is riveted, said clasps being parallel and extending the entire length of the casing, their ends 129 hooking around the forward end of the said casing, as shown in Figs. 1 and 2. At the rearward end of the casing these clasps are connected by an integral plate 130, which crosses the rearward end of the casing just above a lug or projection 131. The rearward end of the extension is riveted to this plate, Fig. 4, and its end is bent downward to lie beneath the lug 31 to prevent vertical movement. At the forward end of the casing the ends 129 fill the space between the lower edges of the flanges of the plate 2 and the top of the extension 7, and no vertical movement at this point is possible.

The board-rule extension is convenient in measuring widths and lengths of boards and may be readily attached to or detached from the measure by spreading the forward ends until the edges 129 will pass over the casing, said parts resuming their normal position by the elasticity of the clasps 128.

The methods of using and adjusting the apparatus are so well understood by those skilled in the art as to require no specific description aside from that already given.

Any of the usual varieties of lumber as to length, breadth, and thickness may be accurately measured by the instrument, the sum total in board-measure being given by the registering mechanism.

With a measuring-wheel four inches in circumference, the ratios of the several pairs of gears are substantially as follows: Referring to Fig. 6, gear 26 is to gear 33 as twenty-one is to sixteen. Gear 34 is to gear 39 as five to seven, this ratio being for ten-foot lengths. Gear 35 is to gear 40 as six is to seven, this ratio being for twelve-foot lengths. Gear 33 is to gear 41 as one is to one, and for fourteen-foot lengths. Gear 36 is to gear 42 as eight is to seven, for sixteen-foot lengths. Gear 37 is to gear 43 as nine is to seven, for eighteen-foot lengths, and gear 70 is to gear 69 as four is to nine. Gear 65 is to gear 84 as five is to four, for stuff one inch thick. Gear 66 is to gear 85 as five is to five, for stuff one and one-fourth inch thick. Gear 67 is to gear 86 as five is to six, for stuff one and one-half inch thick. Gear 68 is to gear 87 as five is to eight, for stuff two inches thick, and gear 87 is to gear 92 as one is to one. The intermediate gears may be of any preferred size, as they do not affect the speed. I do not, however, limit myself to any particular or specified ratio, as this is always subject to change—as, for example, by reducing or increasing the diameter of the master-gear 26 the ratio of the other gears would be changed accordingly in order to accomplish the same result.

What I claim is—

1. In a lumber-measuring apparatus, the combination, with a measuring-wheel and with a train of gearing connecting the same with a registering mechanism, one wheel of said train being mounted on a movable bearing, of a movable runner connected with said bearing and actuating the latter, substantially as described.

2. In a lumber-measuring apparatus, the combination, with a measuring-wheel and with a registering mechanism, of an intermediate train of gearing connecting the same, one wheel of said train being mounted on a movable bearing, a depressible or movable runner, and a pivoted link connecting the runner to said movable bearing, substantially as described.

3. In an apparatus for measuring lumber, the combination, with a measuring-wheel and with a train of gearing, the latter including an intermediate gear journaled on an oscillating arm for making and breaking the operative connection of said train, of a depressible runner and a link connected therewith and with the oscillating arm by means of an inclined or angular slot in the latter, substantially as described.

4. In a lumber-measuring apparatus, the combination, with a measuring-wheel, a train of gearing, and a runner connecting and disconnecting the gearing as said runner is engaged with and disconnected from the lumber, of a shoe mounted and adjustable upon said runner beside the plane of rotation of the measuring-wheel, whereby the longitudinal adjustment of said shoe upon said runner will effect any required compensation, measurement, or allowance for what has been removed from the edges of the boards in working or dressing them, substantially as described.

5. In a lumber-measure, the combination, with a measuring-wheel, a register, and a train of gearing actuating the same, of a depressible runner actuated by contact with the lumber, a device actuated by said runner for making and breaking the operative connection of the measuring-wheel and register, a shoe adjustable parallel with the line of measurement, and a spring catch or dog locking said shoe after adjustment, substantially as described.

6. In a lumber-measure, the combination, with a measuring-wheel, a register, and a series of trains of gearing connecting said wheel and register, and consisting, in part, of a series of differential gears on parallel shafts for varying the speed of the register relatively to that of the measuring-wheel, of a movable runner, a device operated by said runner to make and break the operative connection between said wheel and the register, and a series of slide-bars for making and breaking the operative connection in the said trains of differential gearing connecting said measuring-wheel with the register, substantially as described.

7. In a lumber-measure, the combination, with a measuring-wheel, a register, and a train of gearing connecting the measuring-wheel with the register through said gearing, of a depressible runner making and breaking the operative connection, a shoe mounted on said runner and longitudinally adjustable thereon, a spring-catch mounted on the runner and engaging any one of a series of notches in the shoe, a series of pairs of differential gears on parallel shafts for varying the speed of the register relative to that of the measuring-wheel, and a series of devices operatively connecting and disconnecting any one of said pairs, substantially as described.

8. In a lumber-measure, the combination, with a measuring-wheel having a portion of its periphery projecting from the casing of the measure, of a register, a series of pairs of differential gears mounted upon parallel shafts to connect said measuring-wheel and register and to vary the amount registered according to the length of the lumber, a series of pairs of differential gears also mounted upon parallel shafts and adapted to vary the amount registered according to the thickness of the lumber, and a series of slide-bars connected with a corresponding series of levers carrying differentiated gears, whereby the amount registered is varied according to the length and thickness, substantially as described.

9. In a lumber-measure, the combination, with a measuring-wheel having a portion of its periphery projecting from the casing of the measure, of a register arranged in the latter, a double series of pairs of differential gears mounted upon parallel shafts and adapted to connect the measuring-wheel and the register to vary the action of the latter, a series of spring-retracted slide-bars, each connected with a lever carrying a differentiated intermediate gear, and a transverse trigger holding each slide-bar and automatically releasing the same when a second bar is brought into action, substantially as described.

10. In a lumber-measure, the combination, with a measuring-wheel and register, of a series of pairs of differential gears connecting said wheel and register, a series of spring-retracted slide-bars carrying devices making and breaking the operative connection between said parts and having keys by which they are moved, and a spring-actuated pawl extending across the series of slide-bars and engaging depending lugs thereon, said lugs formed as described, whereby the slide-bar thrown into operative engagement is automatically released and retracted by the engagement of any of the other bars, substantially as described.

11. In a lumber-measure, the combination, with a measuring-wheel and register, of a series of pairs of differential gears mounted on parallel shafts for connecting the said wheel and register, a series of intermediate gears mounted on movable supports, and means for actuating said supports for connecting and disconnecting the wheel and register through any one of said pairs of differential gears, substantially as described.

12. In a lumber-measure, the combination, with a measuring-wheel and a register, of a series of pairs of differential gears connecting said wheel and register, a series of intermediate gears mounted on movable supports, and a series of spring-retracted slide-bars connected with said movable supports, whereby the operative connection of the measuring-wheel and register may be made and broken through any one of the pairs of differential gearing, substantially as described.

13. In a lumber-measure, the combination, with a measuring-wheel and register, of a series of differential gears, a series of intermediate gears mounted on movable yokes, a series of spring-retracted slide-bars connected to said yokes, and a pawl engaging and holding the individual slide-bars in operative position, substantially as described.

14. In a lumber-measure, the combination, with a series of spring-retracted slide-bars, of a series of movable supports carrying devices making and breaking the operative connection of the individual pairs of a series of pairs of differentiated gears, a spring-thrown pawl extending across the series of slide-bars and engaging lugs thereon, said lugs having an inclined surface snubbing the pawl, a shoulder making positive engagement therewith, and a convex or curved end to effect the automatic release of a retained slide-bar upon the engagement of another slide-bar, substantially as described.

15. In a lumber-measure, the combination, with a measuring-wheel and a register operated thereby, of a bell, a striker acting thereon, a clutch and a cam for operating said striker at each successive measurement of a definite number of feet, and a setting device, whereby the parts may be adjusted to give the initial stroke upon the measurement of a fractional part of the whole number of feet representing the interval between successive strokes of the bell, substantially as described.

16. In a lumber-measure, the combination, with a measuring-wheel and a register operated thereby, of a bell, a pivoted striker, a cam operating said striker at stated intervals of measurement, each interval representing a definite number of feet, means for giving movement to the cam, and a setting or index nut mounted on the shaft carrying the cam, whereby the latter may be disengaged from its driving-pinion and so adjusted that the initial stroke of the bell shall be given at any decimal part of the whole number of feet representing the full interval between successive strokes, substantially as described.

17. In a lumber-measure, the combination, with a measuring-wheel and a register operated thereby, of a bell, a pivoted spring-thrown striker acting on the bell, a cam actuating said striker, a worm-gear carrying the cam, a clutch-disk on the shaft of the worm-gear, having detachable and adjustable engagement with a tooth on the cam, a worm-shaft, and a setting or index nut mounted on the cam-shaft, whereby the cam may be set to engage by said tooth with any of the teeth of the clutch-disk, substantially as described.

18. In a lumber-measure, the combination, with a measuring-wheel and a register operated thereby, of a series of trains of differential gearing by any one of which the measuring-wheel may be connected with the register to vary the amount registered thereon according to the different lengths of lumber, a series of slide-bars, a series of yokes carrying gears operatively connecting any one of said trains with the measuring-wheel, a series of pairs of differential gears varying the operation of the register with relation to the thickness of the lumber, a series of movable yokes carrying gears operatively connecting any one of said pairs with the register, a shaft having a series of eccentric-disks arranged quartering with each other and engaging said sliding yokes, and a spring bearing upon an angular nut on the eccentric-shaft, substantially as described.

19. In a lumber-measure, the combination, with a measuring-wheel and a register operated thereby, of a series of pairs of differential gears, a series of sliding yokes carrying gears operatively connecting any one of said trains with the register, an eccentric-shaft carrying eccentric-disks having a quartering arrangement, and a spring bearing against an angular nut on the eccentric-shaft, substantially as described.

20. In a lumber-measure, the combination, with a measuring-wheel and a register operated thereby, of a runner moving upon the lumber and swung upon its point of pivotal support by contact therewith, a link carried by said runner, a lever having a stud lying in an annular slot in said link and carrying a gear meshing with a gear on the shaft of the measuring-wheel and which is thrown by the movement of the lever into and out of operative connection with the train of gearing actuating the register, and a spring-thrown dog engaging a notch in the link when the runner is out of contact with the lumber and the operative connection broken, said dog having a trigger or finger-lever operated to release the link when the measure is grasped, substantially as described.

21. In a lumber-measure, the combination, with a measuring-wheel and register, of a spring-actuated runner drawn toward the measure by contact with the lumber and thrown downward by the spring when released from the lumber, a link carried by said runner and rising and falling therewith to operate a lever making and breaking the operative connection between the measuring-wheel and register, and a spring-engaged dog which snaps into a notch in the link as the latter is thrown by the runner to break such operative engagement, said pawl being provided with a finger-lever projecting at an angle beyond the end of the casing and adapted to be operated to release the link by the finger of the operator, substantially as described.

22. In a lumber-measure, the combination, with a series of spring-retracted slide-bars, each having an actuating-key and a lug, of a series of devices operated by said slide-bars to make and break operative connections in trains of gearing, a series of differential trains of gearing, a measuring-wheel, a register operated by such measuring-wheel, and a retaining-pawl extending across the series of slide-bars, substantially as described.

23. In a lumber-measure, the combination, with a series of differential gearing, of movable devices for operatively connecting the members of any one of said series, a measuring-wheel, and a link or support movable between rigid guides and operatively engaging the measuring-wheel with the register, substantially as described.

24. In a lumber-measure, the combination, with movable devices for operatively connecting any one of a series of gears with the registering mechanism, of a shaft having a corresponding series of eccentrics or cams arranged quartering or to have a successive throw as the shaft is turned, said eccentrics being engaged with and operating the movable devices, and a spring having bearing upon the straight edges of a polygonal nut rigid on the shaft carrying the eccentrics.

In testimony whereof I have affixed my signature in presence of two witnesses.

EMMET N. BARBER.

Witnesses:
C. E. HUMPHREY,
C. P. HUMPHREY.